US008318888B1

(12) United States Patent
Tan et al.

(10) Patent No.: US 8,318,888 B1
(45) Date of Patent: Nov. 27, 2012

(54) TWO-PHOTON ABSORBING CROSS-LINKED POLYURETHANES CONTAINING DELPHENYLAMINO-DIALKYFFLUORENE-1,3,5-TRIAZINE UNITS

(75) Inventors: Loon-Seng Tan, Centerville, OH (US); Matthew Dalton, Bellbrook, OH (US); Ramamurthi Kannan, Cincinnati, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/237,078

(22) Filed: Sep. 20, 2011

(51) Int. Cl.
*H05B 33/14* (2006.01)
(52) U.S. Cl. .......................................... 528/73; 548/152
(58) Field of Classification Search .................. None
See application file for complete search history.

(56) References Cited

U.S. PATENT DOCUMENTS

| | | | |
|---|---|---|---|
| 6,300,502 B1 | 10/2001 | Kannan et al. |
| 6,555,682 B1 | 4/2003 | Kannan et al. |
| 6,730,793 B1 | 5/2004 | Kannan et al. |
| 6,867,304 B1 | 3/2005 | Tan et al. |
| 7,067,674 B1 | 6/2006 | Kannan et al. |
| 7,319,151 B1 | 1/2008 | Tan et al. |

OTHER PUBLICATIONS

Dalton, Matthew J.; Kannan, Ramamurthi; Haley, Joy E.; He, Guang-S.; McLean, Daniel G.; Cooper, Thomas M.; Prasad, Paras N.; Tan, Loon-Seng, "Aromatic Polyimides Containing Main-Chain Diphenylaminofluorene-Benzothiazole Motif: Fluorescence Quenching, Two-Photon Properties, and Exciplex Formation in a Solid State" Macromolecules 2011, 44(18), 7194-7206.
Jhaveri, Shalin J.; McMullen, Jesse D.; Sijbesma, Rint; Tan, Loon-Seng; Zipfel, Warren; Ober, Christopher K. Direct Three-Dimensional Microfabrication of Hydrogels via Two-Photon Lithography in Aqueous Solution. Chemistry of Materials (2009), 21(10), 2003-2006.
Rogers, Joy E.; Slagle, Jonathan E.; McLean, Daniel G.; Sutherland, Richard L.; Brant, Mark C.; Heinrichs, James; Jakubiak, Rachel; Kannan, Ramamurthi; Tan, Loon-Seng; Fleitz, Paul A. Insight into the Nonlinear Absorbance of Two Related Series of Two-Photon Absorbing Chromophores. Journal of Physical Chemistry A (2007), 111(10), 1899-1906.

He, Guang S.; Tan, Loon-Seng; Zheng, Qingdong; Prasad, Paras N. Multiphoton Absorbing Materials: Molecular Designs, Characterizations, and Applications. Chemical Reviews (Washington, DC, United States) (2008), 108(4), 1245-1330.
Kannan, Ramamurthi; He, Guang S.; Lin, Tzu-Chau; Prasad, Paras N.; Vaia, Richard A.; Tan, Loon-Seng. Toward Highly Active Two-Photon Absorbing Liquids. Synthesis and Characterization of 1,3,5-Triazine-Based Octupolar Molecules. Chemistry of Materials (2004), 16(1), 185-194.
He, Guang S.; Lin, Tzu-Chau; Dai, Jianming; Prasad, Paras N.; Kannan, Ramamurthi; Dombroskie, Ann G.; Vaia, Richard A.; Tan, Loon-Seng. Degenerate two-photon-absorption spectral studies of highly two-photon active organic chromophores. Journal of Chemical Physics (2004), 120(11), 5275-5284.
Kannan, Ramamurthi;He, Guang S.; Yuan, Lixian; Xu, Faming; Prasad,Paras N.; Dombroskie, Ann G.;Reinhardt, Bruce A.;Baur, Jeffery W.; Vaia, Richard A.; Tan, Loon-Seng. Diphenylaminofluorene-Based Two-Photon-Absorbing Chromophores with Various-Electron Acceptors. Chemistry of Materials (2001), 13 (5), 1896-1904.
Ambrosio, A.; Orabona, E.; Maddalena, P.; Camposeo, A.; Polo, M.; Neves, A. A. R.; Pisignano, D.; Carella, A.; Borbone, F.; Roviello, A., Two-photon patterning of a polymer containing Y-shaped azochromophores. Applied Physics Letters (2009), 94(1), 011115/1-011115/3.
Dong-Seon Won, Jin-Hyang Kim, Hyo Jin No, You Jin Cho, Ju-Yeon Lee, Bum Ku Rhee, Hee-Dok Choi "Synthesis and nonlinear optical properties of a novel polyurethane containing cyanovinylthiophene with enhanced thermal stability of dipole alignment for electro-optic applications," Polymer International (2010), 59(2), pp. 162-168.
Beecher, J. E.; Frechet, J. M.; Willand, C. S.; Robello, D. R.; Williams, D. J. "Concurrent stabilization and imaging of a novel polymer for second harmonic generation via in situ photopolymerization" From Report (1994), (TR-14-ONR; Order No. AD-A278 912), 70 pp.. Language: English, Database: CAPLUS.
Yuxia, Z.; Zhao, L.; Ling, Q.; Jianfen, Z.; Jiayun, Z.; Yuquan, S.; Gang, X.; Peixian, Y. "Synthesis and characterization of a novel nonlinear optical polyurethane polymer ," European Polymer Journal (2001), 37(3), 445-449.

*Primary Examiner* — Randy Gulakowski
*Assistant Examiner* — Jeffrey Washville
(74) *Attorney, Agent, or Firm* — Bart Hersko; AFMCLO/JAZ

(57) ABSTRACT

Two-photon absorbing (2PA), cross-linked polyurethanes were prepared from bis(isocyanato) monomers, tris(isocyanato) monomers or a mixture of bis(isocyanato) and tris (isocyanato) monomers, in conjunction with a novel polyol molecules with donor-acceptor octupolar geometry, whose generic structure is comprised of an electron-accepting 1,3, 5-triazine hub with three spokes constituted by electron-donating triarylalkylamine end-groups, which are polyfunctionalized with thermally reactive alcohol functions. The resulting neat glassy or rubbery solids are applicable in a wide range of linear & nonlinear optical applications.

5 Claims, No Drawings

TWO-PHOTON ABSORBING CROSS-LINKED POLYURETHANES CONTAINING DELPHENYLAMINO-DIALKYFFLUORENE-1,3,5-TRIAZINE UNITS

RIGHTS OF THE GOVERNMENT

The invention described herein may be manufactured and used by or for the Government of the United States for all governmental purposes without the payment of any royalty.

BACKGROUND OF THE INVENTION

The present invention relates to cross-linked or network polymers containing covalently bound chromophores with large, effective two-photon absorption cross-sections in near-infra-red spectral region and good linear transmission in the visible region.

Two-photon or multiphoton absorption occurs through the simultaneous absorption of two or more photons via virtual states in an absorbing medium, with the former being more common. For a given chromophore, these absorption processes take place at wavelengths much longer than the cut-off wavelength of its linear (single-photon) absorption. In the case of two-photon absorption (2PA), two quanta of photons may be absorbed from a single light source (degenerate 2PA) or two sources of different wavelengths (non-degenerate 2PA). Although multiphoton absorption processes have been theoretically described in 1931 and experimentally confirmed about 30 years later, this field remained dormant largely due to the lack of materials with sufficiently large two-photon sensitivity, quantified as two-photon cross-section ($\sigma_2'$), which is usually expressed in the units of Göppert-Mayer (1 GM=$10^{-50}$ cm$^4$.s.photon$^{-1}$.molecule$^{-1}$).

Then, in the mid-1990s, several new classes of chromophores exhibiting very large effective $\sigma_2'$ values were reported. In conjunction with the increased availability of ultrafast high-intensity lasers, the renewed interest has not only sparked a flurry of activities in the preparation of novel dye molecules with enhanced $\sigma_2'$ values, but also in advancing many previously conceived applications based on 2PA process in photonics and biophotonics, which are now enabled by these new chromophores. It is important to recognize the following useful features of the 2PA phenomenon based on the fact that 2PA scales nonlinearly with the squared intensity of the incident laser beam: (a) upconverted emission, whereby an incident light at lower frequency (energy) can be converted to an output light at higher frequency, for instance, near infrared (NIR) to ultraviolet (UV) upconversion; (b) deeper penetration of incident NIR light (into tissue samples, for example) than UV light that also may be hazardous with prolonged exposure; (c) highly localized excitation as compared with one-photon processes allowing for precise spatial control of in situ photochemical or photophysical events in the absorbing medium, thereby minimizing undesirable activities such as photodegradation or photobleaching; and (d) fluorescence, when properly manipulated, that would allow for information/signal feedback or amplification in conjunction with other possible, built-in effects such as surface plasmonic enhancement.

It is anticipated that further ingenious utilization of these basic characteristics will lead to practical applications other than the ones that have already emerged in such diverse areas as bio-medical fluorescence imaging, data storage, protection against accidental laser damage, microfabrication of micro-electromechanical systems (MEMS), photodynamic therapy, etc. In the past decade or so, significant advances have been made in the fundamental understanding of general structure-property relationships that have led to the design and synthesis of two-photon absorbers with very large cross-section values. Although further enhancement of 2PA cross-section is still possible as suggested by a number of theoretical studies, for certain applications, the two-photon-property requirement has essentially been met by the state-of-art chromophores. Because of the possible property-processing/fabrication trade-off, the secondary properties, e.g. thermal and mechanical properties, which are important to material processing into various useful forms (films, coatings, fibers, windows etc.) and configurations, should be addressed. For the aforementioned solid forms, polymers can offer many advantages such as the flexibility in fine-tuning the material properties and the availability of many processing options.

Polyurethanes are one of the most versatile commodity polymers that are found in general applications such as coatings, adhesives, composite matrices, shape-memory polymers, etc. They are best known to the general public in the form of flexible foams that can be found in upholstery, mattresses, earplugs, and packaging as well as rigid foams in the insulation for buildings, water heaters, refrigerated transport, and commercial and residential storage refrigeration. In more advanced applications, polyurethanes have been shown to be promising as matrix polymers for electro-optical devices (see, e.g., D. S. Won et al. Polymer International, 2010; 59:162-168) and two-photon lithography (see, e.g., A. Ambrosio et al. Applied Physics Letters, 2009; 94, 011115).

Typically conducted under anhydrous condition, polyurethanes are formed by reacting a polyol (an alcohol with more than two reactive hydroxyl groups per molecule, A(OH)$_x$, where x=2, 3, 4, 5, 6 . . . ) with a diisocyanate or a polymeric isocyanate [B(NCO)$_y$, where y=2, 3, 4, 5, 6 . . . ] under the influence of heat and/or in the presence of suitable catalysts and additives. Linear polyurethanes are typically produced from the generic reaction of A(OH)$_2$ and B(NCO)$_2$. Cross-linked or network polyurethanes are generated from the various combinations of A(OH)$_x$+B(NCO)$_y$, where either X or Y or both must be greater than 2. For advanced optical applications where two-photon properties are required, a practical advantage of using polyurethane as a matrix polymer is that a good selection of the polyol and polyisocyanate monomers, which can be cured to form glass-like clear films, lenses and windows, are readily available in large quantity and at low cost. An attractive feature of the cross-linked polyurethanes is the possibility of tailoring the processing and fabrication conditions to be solventless and to be compliant to green manufacturing practices.

Accordingly, it is an object of the present invention to provide two-photon active thermosetting polymers that (i) are generated from thermally reactive multifunctional monomers under practically solventless conditions; (ii) are comprised of network structure at the molecular level, leading to amorphous and visually transparent solids; (iii) contain in their repeat units the essential components such as electron-donating triarylamine and electron-accepting 1,3,5-triazine moieties as well as conjugated bridges such as 2,7-fluorenyl, para-phenylene and related para-phenylenevinylene when in combination are known for high 2PA response.

A specific object is to provide two-photon absorbing (2PA) solid materials prepared from solventless thermal polymerization of a novel polyhydroxylated AFX chromophores with commercially available organic bis(isocyanato) and tris(isocyanato) monomers resulting in 2PA-active, cross-linked polyurethane boules containing chromophores with the structural motif, in which a 1,3,5-triazine core is triply connected to tertiary amino endgroups via 9,9-dialkyfluorenyl bridges.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided new 2PA-active, cross-linked polyurethanes with the recurring structure as represented by the following generic structure:

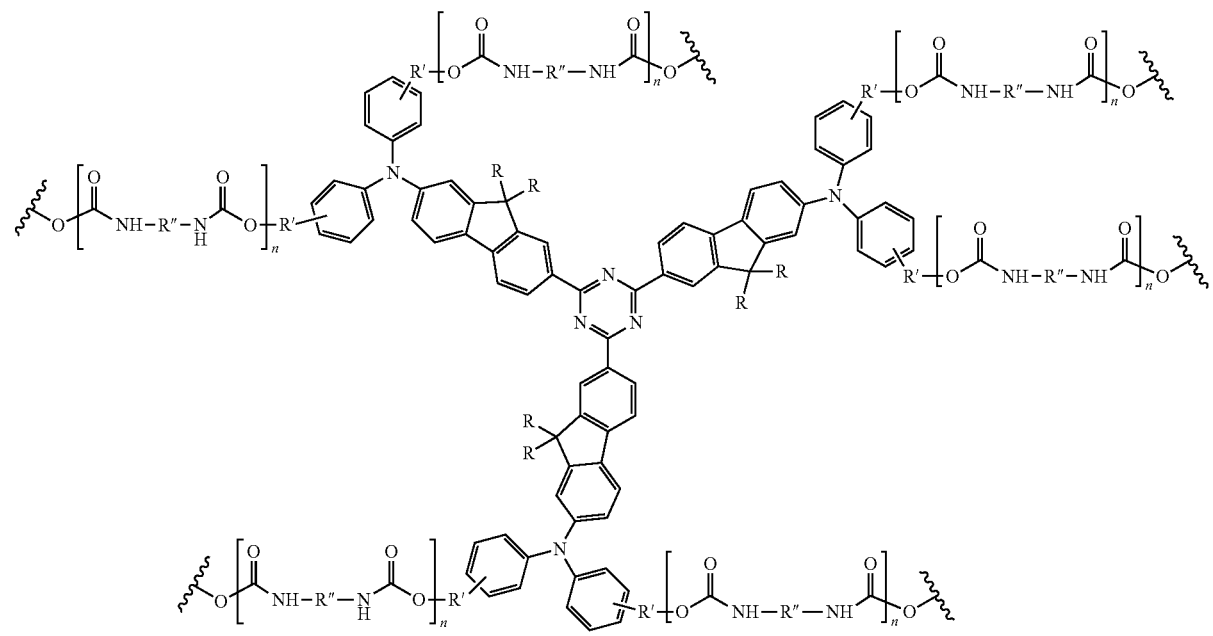

wherein R=linear or branched alkyl groups, $-C_mH_{2m+1}$, where m=1-6 or alkylether group, $-(CH_2CH_2O)_p$Me, where p=1-5; R'=linear or branched groups such as $-C_mH_{2m}$, where m=1-6; linear $-(CH_2)_m$, where m=2-6, or branched alkyl group such as $-C(CH_3)_2-$ (isopropyl); R''=linear or branched groups such as $-C_mH_{2m}$, where m=1-6; cycloaliphatic groups such as -cyclohexyl-CH$_2$-chclohexyl- and isophorone. The aromatic substitution pattern for each of the R' groups can be in either meta or para position with reference to the triarylamine nitrogen atom.

DETAILED DESCRIPTION OF INVENTION

A generic structure for the subject polyhydroxy 1,3,5-triazine-based AFX chromophores (generically identified as AF-452-TOH) is shown below:

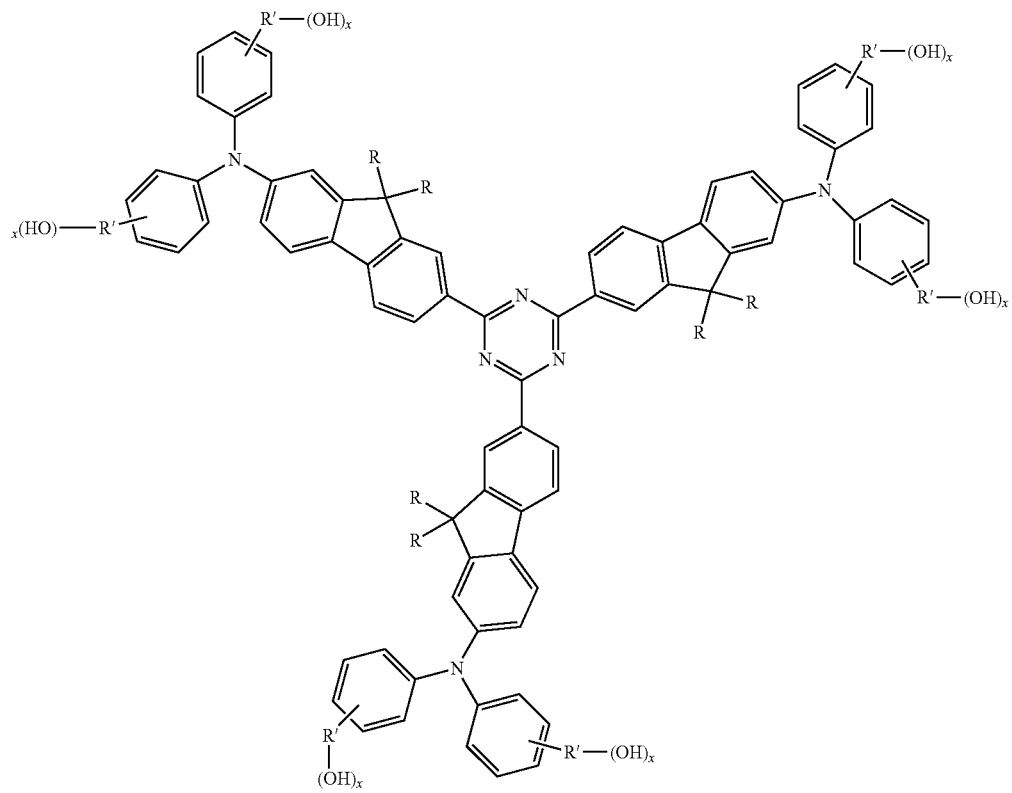

wherein R is a linear or branched alkyl group, —$C_mH_{2m+1}$, where m=1-6 or an alkylether group, —$(CH_2CH_2O)_pMe$, where p=1-5. The number of R'—$(OH)_x$ groups, where X=1-3, attached to the phenyl rings of the triarylamine moiety either in a para or a meta position, could be 3 or 6 per molecule, or mixtures of molecules containing different numbers of R'—$(OH)_x$ groups, depending on conditions for manufacture of such mixtures.

As an illustration, a hexahydroxy 1,3,5-triazine-based AF-450 derivative (U.S. Pat. No. 6,555,682) designated as AF-452-6OH was synthesized following the synthetic scheme shown in Scheme 1 and briefly described in the following paragraph.

The convergent synthesis of AF-452-6OH (compound 9 in Scheme 1) was accomplished in two parallel sequences followed by a converging sequence: (i) a 4-step sequence to the protected 3-O-alkylated diphenylamine intermediate, (ii) a 3-step sequence to the tris(7-bromofluorene(triazine intermediate 7 and (ii) a 2-step sequence to AF-452-6OH (8). Briefly, the first sequence was started with tris-1,1,1-(hydroxymethyl)ethane, which was first protected as an acetonide derivative, i.e. 2,2,5-trimethyl-5-hydroxymethyl-1,3-dioxane (compound 1) in either reaction as indicated in Scheme 1, as reactions (i) or (ii). A Mitsunobu reaction of 1 with 3-bromophenol furnished the corresponding bromophenoxy-methyltrimethyl-1,3-dioxane (2) in 85% yield [Scheme 1, reaction (iii)]. The same compound could also be obtained in 59% yield from a copper-catalyzed reaction between 3-bromoiodobenzene and 1 [Scheme 1, reaction (iv)]. Compound 2 was aminated with aniline to produce the diphenylamine intermediate 3 [Scheme 1, reaction (v)]. In the second sequence, 2,7-dibromo-9,9-diethylfluorene (4) was first monoformylated to form 7-bromodiethylfluorene-2-aldehyde (5), which was then converted to the nitrile intermediate (6) in 93% yield [Scheme 1, reactions (vi) and (viii), respectively]. A less satisfactory conversion of the aldehyde intermediate 5 to the nitrile intermediate 6 via an hydroxyl-imine intermediate was also conducted [49% yield, Scheme 1, reaction (vii)]. The nitrile intermediate 6 was subsequently and catalytically trimerized in trifluoromethanesulfonic acid to afford the tribromo-1,3,5-triazine intermediate (7) in 95% yield [Scheme 1, reaction (ix)]. Covalently joining the triazine (7) component with the diphenylamine component (3) with the assistance of a Pd-catalyzed amination gave the precursor chromophore protected as an acetonide 8, [Scheme 1, reaction (x)]. Removal of the acetone protecting groups from 8 was accomplished by mixing and stirring 8 together with Dowex-50Wx2 (acid-form) resin, and the desired product, AF-452-6OH (9), was obtained in 90% yield [Scheme 1, reaction (xi)].

Scheme 1:
Synthetic Scheme for AF-452-6OH
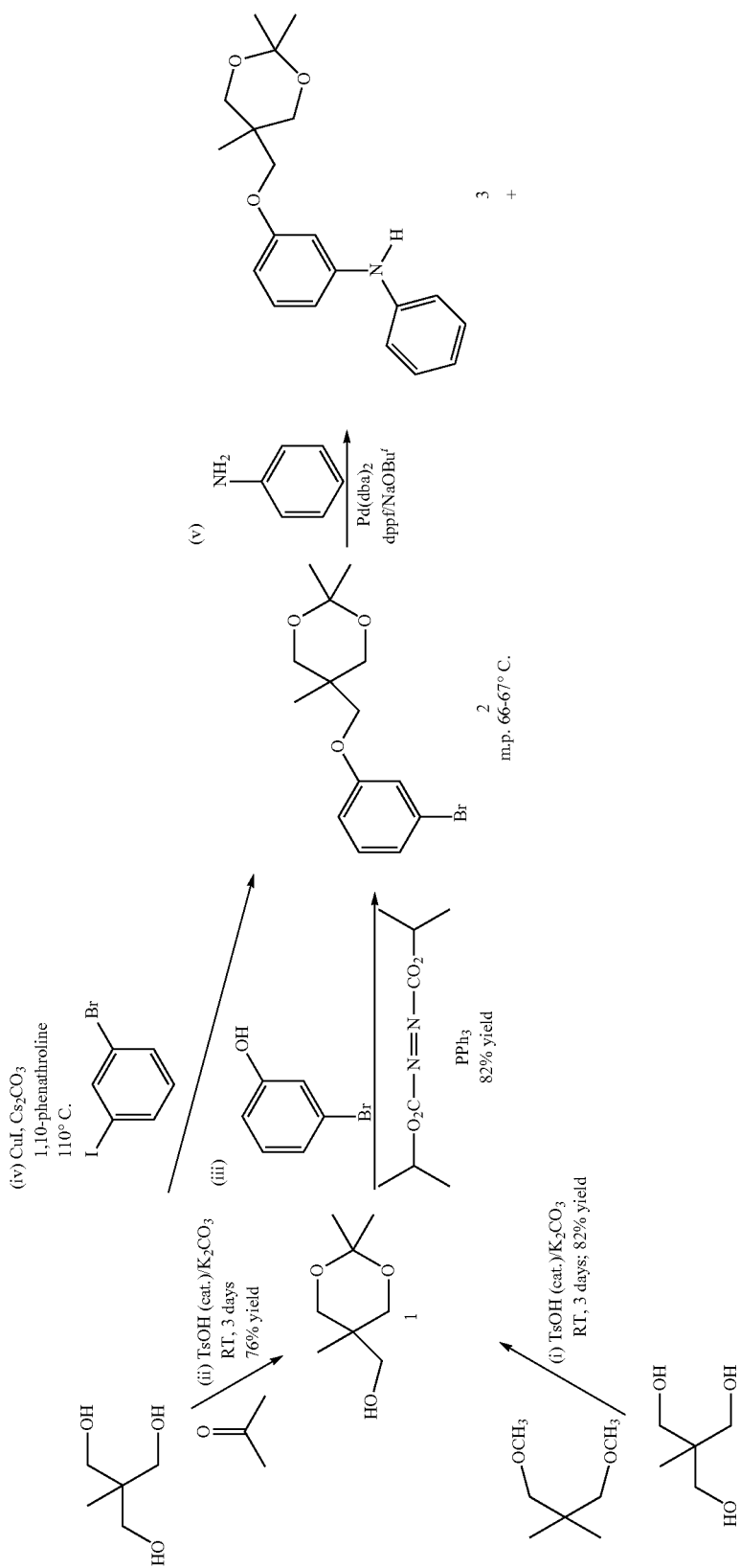

-continued
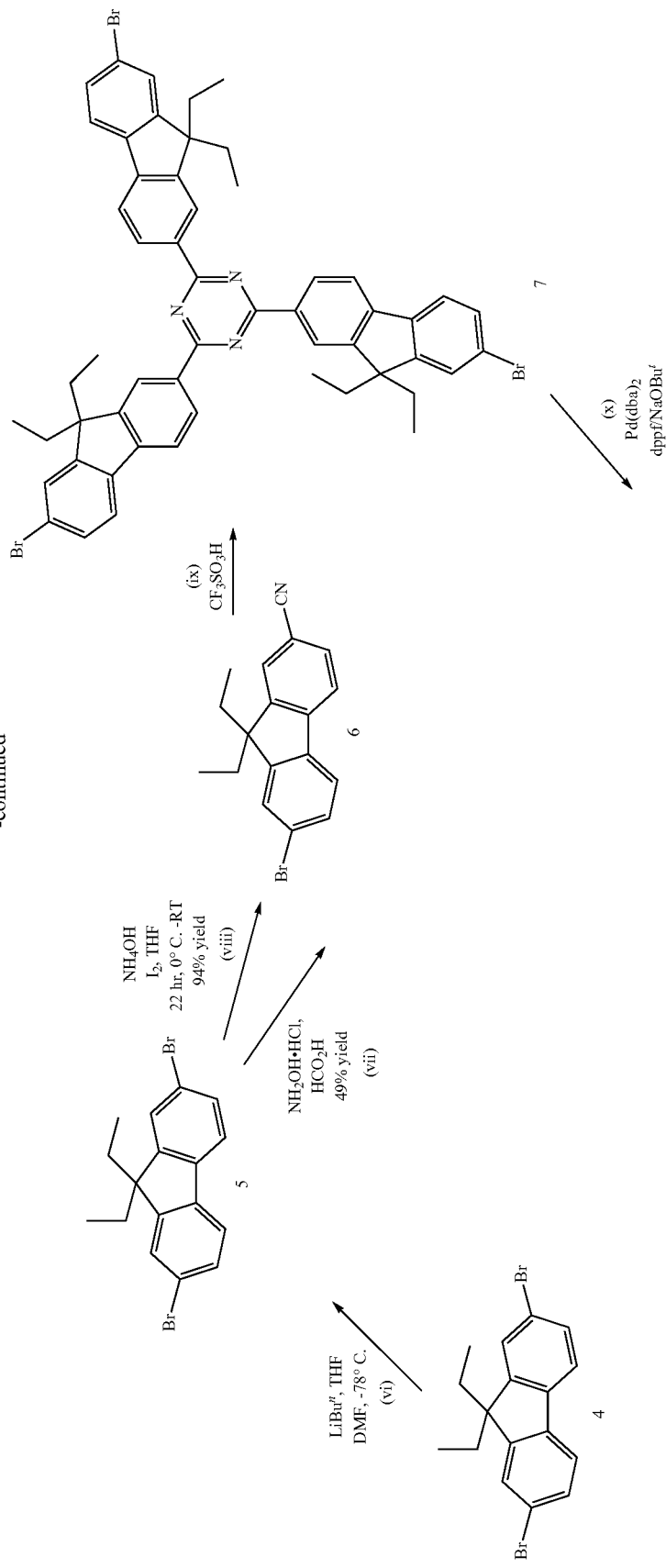

-continued
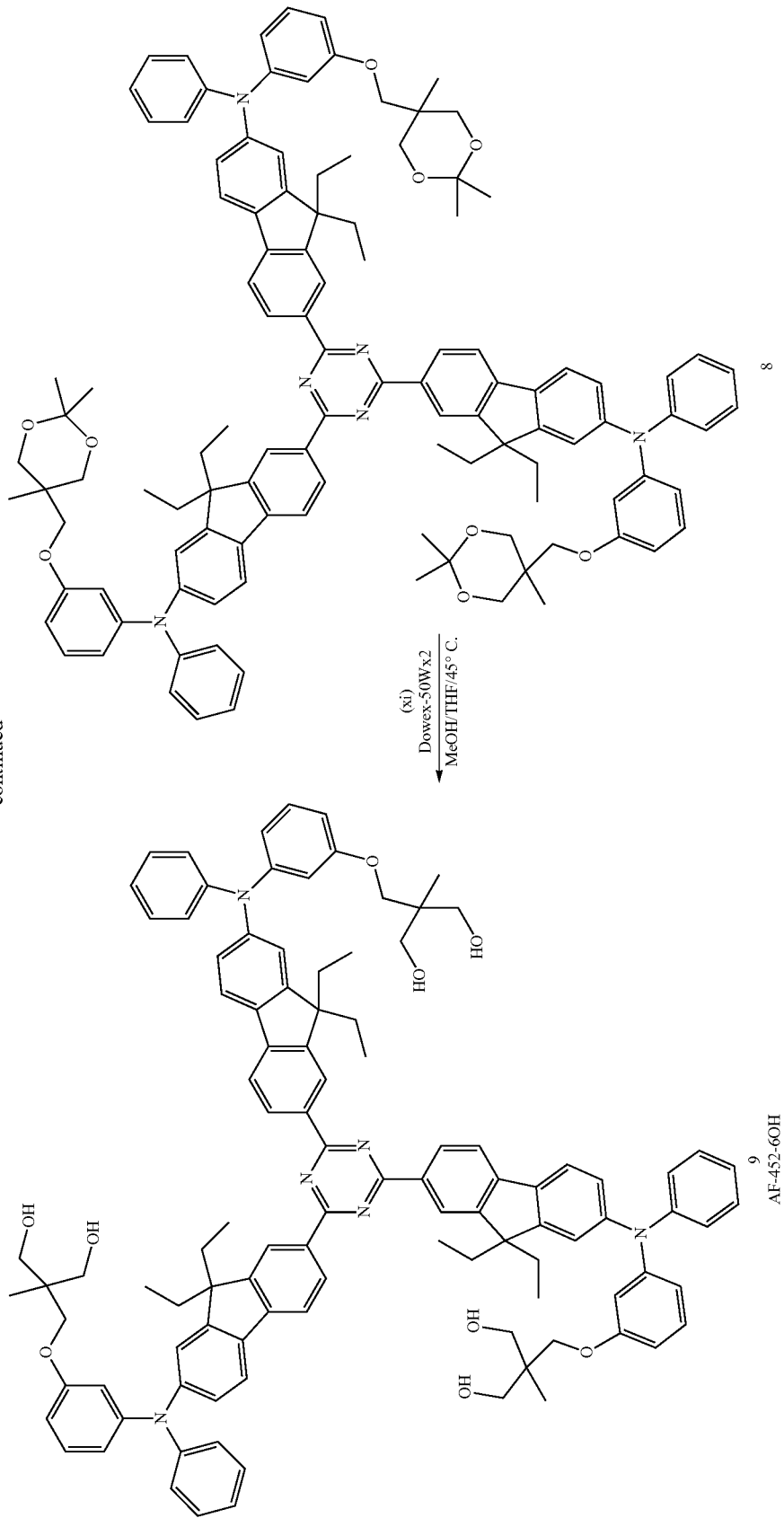

AF-452-6OH (9 in Scheme 1), which contains three sets of 1,3-diols, is expected to react with a wide range of industrially useful electrophiles such as the ones that contain carbonyl (i.e. ketone, aldehyde, carboxylic acid, anhydride or acid halide), isocyanate, and halosilyl groups.

The crosslinked polyurethane and optically clear solids can be prepared by co-reacting AF-452-TOH with a bifunctional isocyanato monomer, a trifunctional monomer or a mixture of both in the equivalent ratios of NCO (isocyanate):OH (hydroxyl), ranging from 0.9:1:0 to 1.20:1.0, preferably, in the molar-ratio range of 1:05:1.0 to 1.10:1.0 for trifunctional isocyanato monomers with high aliphatic content.

An example for obtaining such crosslinked polyurethane is outlined in Scheme 2, and an idealized molecular structure showing the two-photon active AF-452 unit forming urethane (carbamate) linkages with six biuret-containing chains is depicted in Scheme 3. This structure may be considered as the basic (recurring) unit in the polymer structure of the cross-linked polyurethane solid. Other difunctional and trifunctional isocyanato monomers, including but not limiting to those shown in Schemes 4 and 5, respectively, may also be used.

Scheme 2:
Thermal polymerization of AF-542-6OH with a trifunctional isocyanato monomer to form cross-linked polyurethane solid

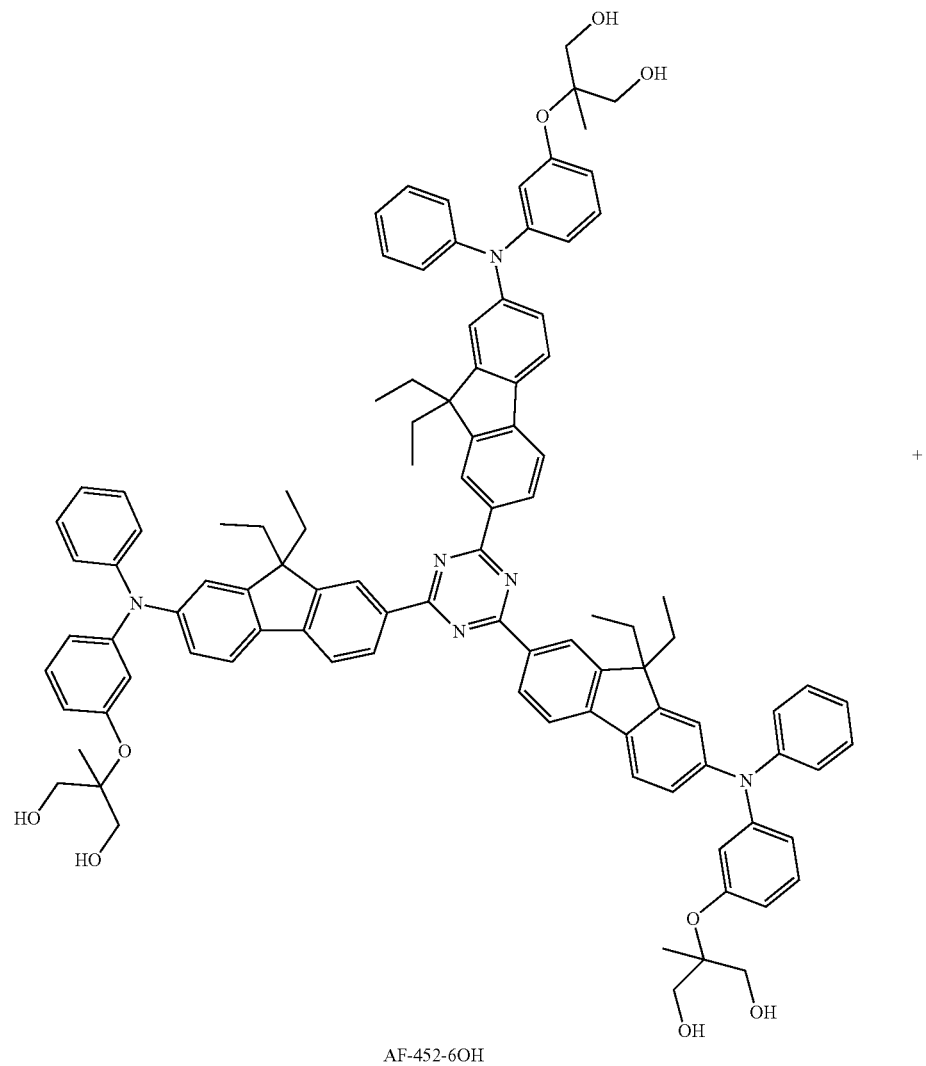

AF-452-6OH

-continued
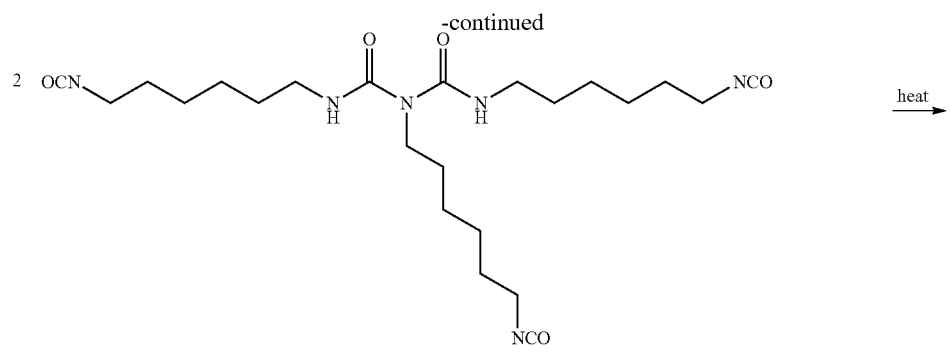
Desmodur N 3200
N'N'N'''-(tris(6-isocyanatohexamethylene)biuret
→ heat
Cross-linked Polyurethane Solid

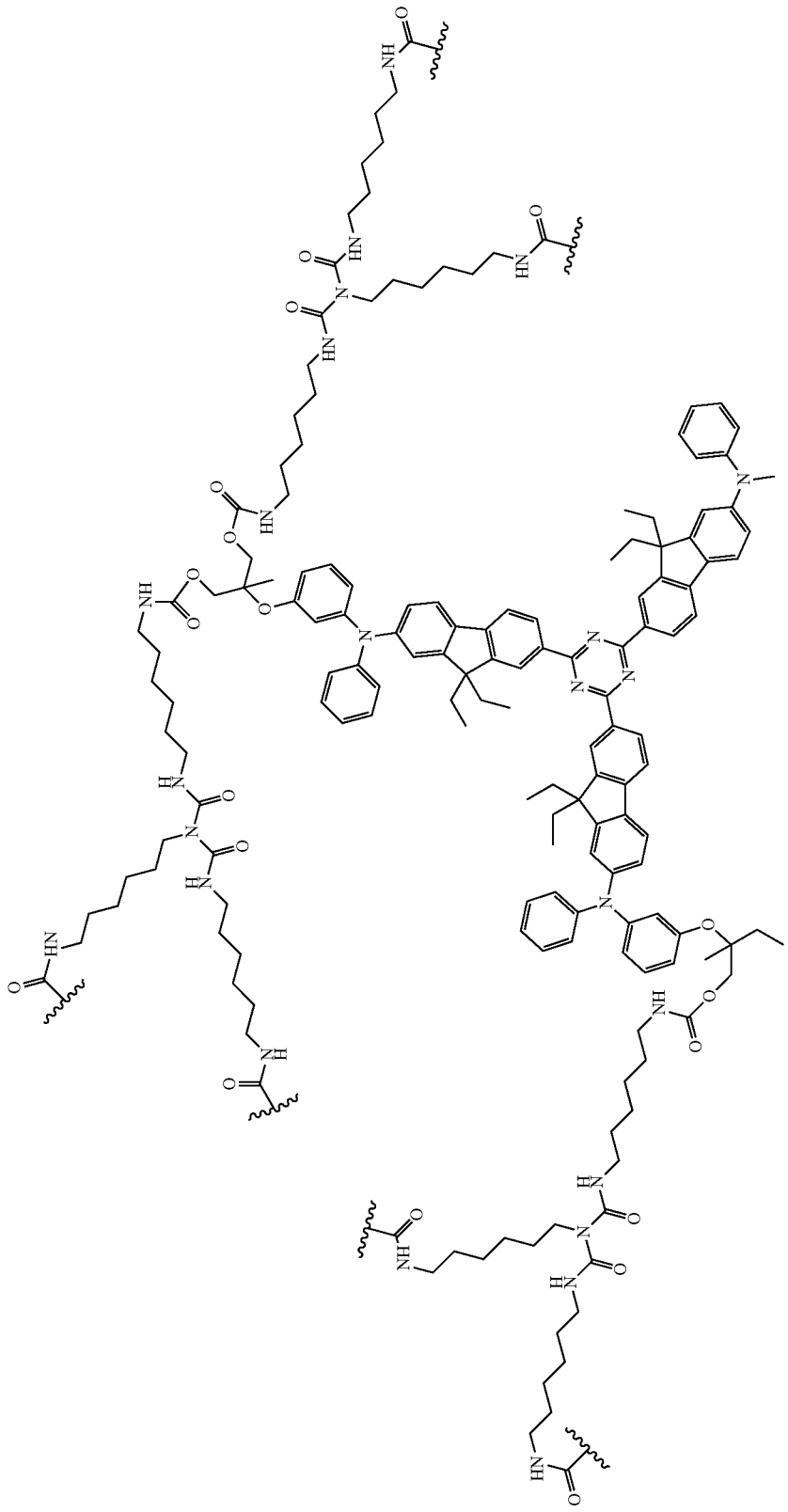
Scheme 3:
Recurring basic unit structure of cross-linked polyurethane derived from AF-452-6OH and N'N',N',N'''-tris(6-isocyatatomethylene)biuret -continued
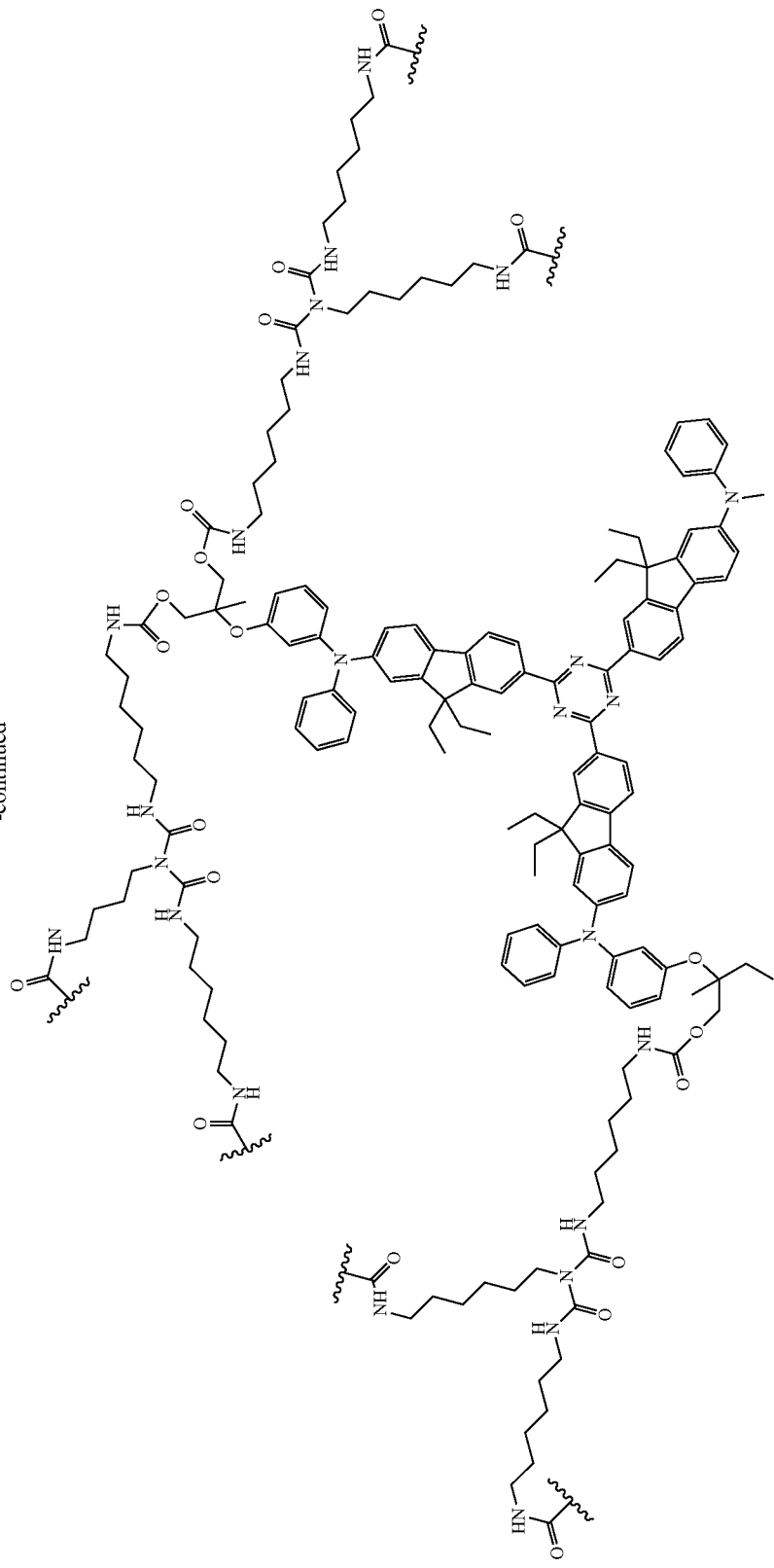

-continued
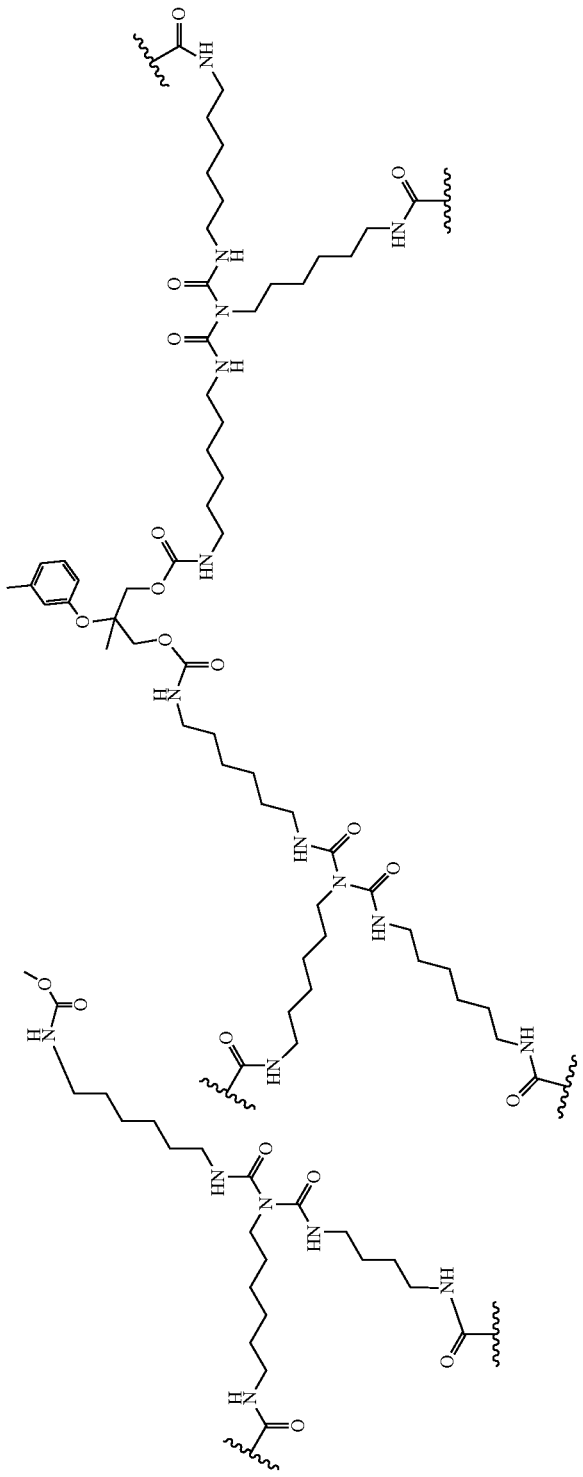

Scheme 4:
Difunctional isocyanato monomers for AF-452-TOH-based cross-linked polyurethane

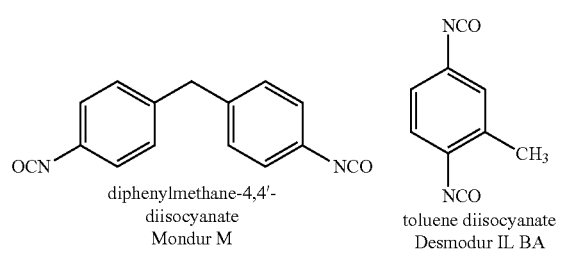

diphenylmethane-4,4'-diisocyanate
Mondur M toluene diisocyanate
Desmodur IL BA

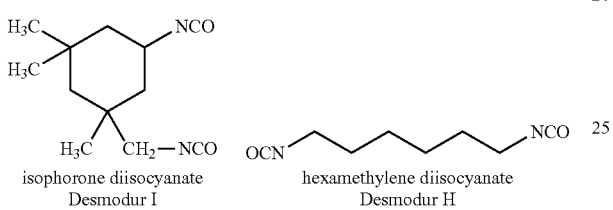

isophorone diisocyanate
Desmodur I hexamethylene diisocyanate
Desmodur H

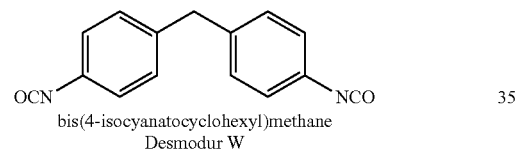

bis(4-isocyanatocyclohexyl)methane
Desmodur W

Scheme 5:
Trifunctional isocyanato monomers for AF-452-TOH-based cross-linked polyurethane

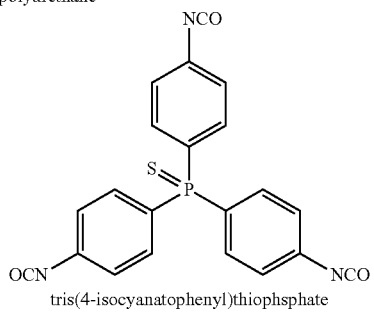

tris(4-isocyanatophenyl)thiophsphate

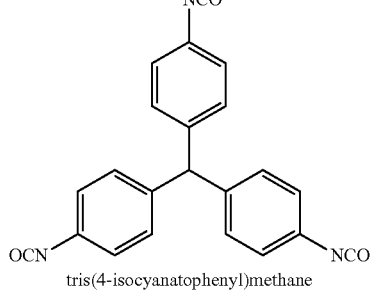

tris(4-isocyanatophenyl)methane

-continued

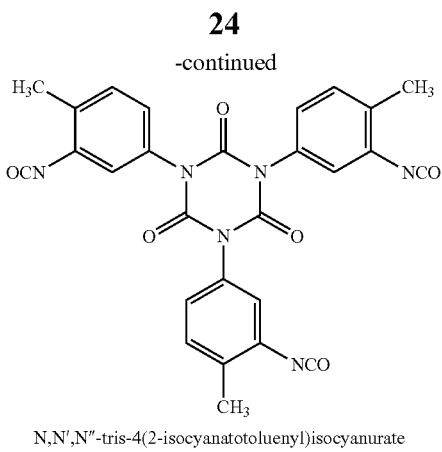

N,N',N''-tris-4(2-isocyanatotoluenyl)isocyanurate

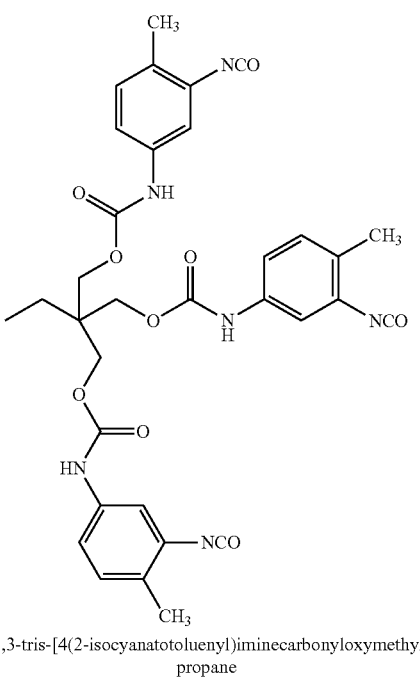

3,3,3-tris-[4(2-isocyanatotoluenyl)iminecarbonyloxymethyl]-propane

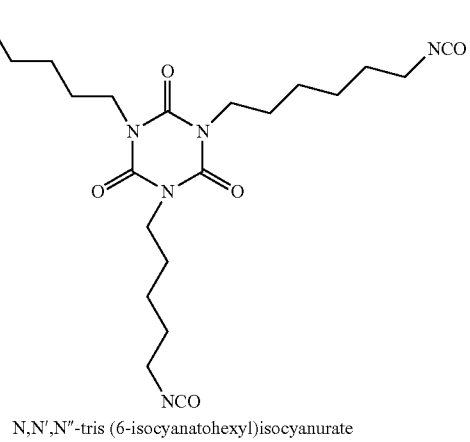

N,N',N''-tris (6-isocyanatohexyl)isocyanurate

-continued

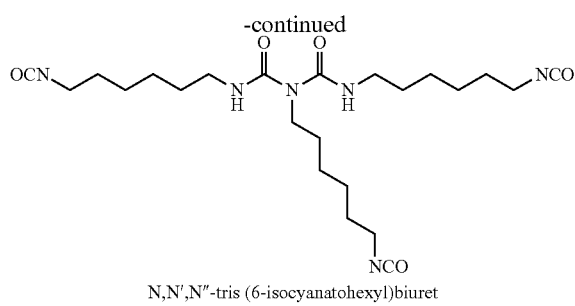

N,N′,N″-tris (6-isocyanatohexyl)biuret

Further, a diol compounds such as 1,4-butanediol, 1,6-hexanediol or 2,2-bis(4-phenol)-1,1,1,3,3,3-hexafluoropropane (6F-BPA) could be added as a co-monomer to tailor the mechanical and optical properties of the cross-linked polyurethane solids and a catalyst such as DABCO and dibutyltin dilaurate can be added as a catalyst to accelerate the rate of thermal curing.

Two-photon properties: The linear optical and two photon properties for the newly synthesized dyes are expected to be similar to those of related AFX chromophores, namely AF-450, AF-455 and AF-457 described in U.S. Pat. No. 6,555,682. The effective 2PA cross-sections ($\sigma_2'1$ GM=$10^{-50}$ cm$^4$-sec/photon-molecule; ±15% uncertainty) of these AFX chrmophores were measured by a nonlinear transmission (NLT) technique in THF solution (0.02 M) at 800 nm with ~8 ns laser pulses and found to be in the range of 28,000-40,000 GM. The two-photon spectra of these AFX chromophores have also been determined by a femtosecond, degenerate white-light continuum technique in THF from 600-900 nm with the peak values for the intrinsic 2PA cross-section found in the range of 200-220 GM at 779 nm.

The polyurethanes of this invention can be synthesized following the procedures given in the following Examples which illustrate the invention:

EXAMPLE 1

2,7-Dibromofluorene

To a mechanically stirred mixture of fluorene (113.76 g., 0.68 mol), iodine (1.96 g., 0.0077 mol), and methylene chloride (750 mL), bromine (74 mL, 1.44 mol) diluted with methylene chloride (100 mL) was added dropwise at room temperature over a period of 1.5 hours. After 5 minutes, a solution of sodium bisulfite (15.0 g) in water (100 mL) was added and the mixture was stirred for 30 minutes, when the mixture became colorless. Water (750 mL) was then added, and methylene chloride was distilled off. The product slurry was filtered and the product was air-dried, 220.5 g., m.p. 151 (sh), 156-160° C. This material was used in the next step without further purification.

EXAMPLE 2

2,7-Dibromo-9,9-diethylfluorene

To a mechanically stirred mixture of 2,7-dibromofluorene (66.5 g., 0.205 mol.) (commercially available), powdered potassium hydroxide (56.0 g., 1.0 mol.), potassium iodide (3.4 g.) and DMSO (150 ml), cooled to 10° C., ethyl bromide (40 ml, 58.4 g. 0.536 mol.) was added dropwise over 45 minutes. The mixture turned from red to light purple. After allowing the temperature to warm to 20° C., the mixture was left overnight to stir and poured into water, 77.0 g (98.7% yield), m.p. 144-153° C. The product was then recrystallized from hexane (550 mL) with charcoal treatment, and collected in two crops, m.p. 154-157° C. and 153-154° C., totaling 60.36 g. (77.4% yield).

EXAMPLE 3

7-Bromo-9,9-diethyl-fluorene-2-carboxaldehyde

To a mechanically stirred solution of 9,9-diethyl-2,7-dibromofluorene (59.38 g., 0.1563 mol.), in THF (325 ml), cooled in dry ice-ethanol bath, n-butyl lithium (104 ml of 1.6M solution in hexanes, 0.1664 mol, 1.06 eq.) was added dropwise over 25 minutes. After 20 minutes, DMF (17 ml, 0.22 mol.) in THF (30 ml) was added, and the mixture was stirred in the cooling bath for 1.5 hours, and outside the bath for 1 hour. The reaction was then cooled to 5° C., and treated with hydrochloric acid (12.5 of concentrated hydrochloric acid diluted with 50 ml water). The mixture was diluted with 200 ml of toluene, and the aqueous phase was separated and extracted with 200 ml of toluene. The combined organic phase was washed with dilute sodium bicarbonate solution, dried over magnesium sulfate and concentrated. The residual solids were recrystallized from heptane-ethyl acetate (9:1), to get colorless solids, 40.29 g. (78.4% yield) m.p. 126-128° C. The mother liquor after chromatography over 150 g. silica gel, elution with 1:1 heptane-toluene, and trituration of residual solids in hexanes gave additional product, 6.56 g. (12.8% yield, total 91% yield), m.p. 126-128° C. Mass Spec: m/z 328, 330, (M$^+$). A sample for analysis was prepared by recrystallization from hexanes, m.p. 127-129° C. Analysis: Calculated for $C_{18}H_{17}BrO$, C, 65.55, H, 5.20, and Br 24.27%. Found, C, 65.60, H, 5.51, and Br 24.71%.

EXAMPLE 4

7-Bromo-9,9-diethylfluorene-2-carbonitrile

To a mechanically stirred mixture of 7-bromofluorene-9,9-diethyl-2-carboxaldehyde (32.0 g, 97.2 mmol), THF (400 mL), 28% ammonium hydroxide solution (800 mL), cooled to 5° C., iodine (16.0 g, 60.0 mmol) was added in portions, and the mixture was allowed to warm to room temperature. After 5 hours, the mixture was cooled and a second portion of iodine (16.0 g, 60.0 mmol) was added, and the stirring was continued for 18 hours. Toluene (600 mL) was added, and the organic phase was washed with water, dried and concentrated. The residue was dissolved in hot hexanes (75 mL), and cooled. The crystalline nitrile product that separated upon cooling was collected, 29.88 g (94% yield), m.p. 87-89° C. Mass spec: m/z 325, 327 (M$^+$).

An alternate, but less satisfactory synthesis was conducted as follows: A mixture of 7-bromo-9,9-diethylfluorene-2-carboxaldehyde (3.29 g, 10.0 mmol), hydroxylamine hydrochloride (0.9 g, 10.0 mmol), and formic acid (15 mL), was held at reflux for 2 hours, cooled and filtered. The filtrate was worked up by extraction into toluene, washing the extract with water, and bicarbonate solution, drying and concentration. The residue was combined with the formic acid-insoluble solids, and chromatographed over silica gel. There were obtained, the desired nitrile product, 1.58 g (49%), m.p. 85-87° C., mass spectrum (m/z): 325, 327 (M$^+$); the amide byproduct, 0.42 g (12%), m.p. 179-184° C., mass spectrum (m/z): 343, 345 (M$^+$); and the oxime by-product, m.p. 104-107° C., 0.17 g (5%), mass spectrum (m/z): 343 (M$^+$)

EXAMPLE 5

2,2,5-Trimethyl-5-hydroxymethyl-1,3-dioxane

To a solution of 1,1,1-tris(hydroxymethyl)ethane (50.4 g) in acetone (dried over calcium chloride, 550 mL), 4-toluenesulfonic acid monohydrate (0.4 g) was added, and stirred at room temperature for 3 days. Potassium carbonate (2.0 g) was added, and the mixture was filtered and concentrated. The residue was taken in dichloromethane (200 mL), and the solution was washed with water (2×75 mL), dried and concentrated. The residual liquid, 54.75 g, was distilled to get colorless liquid, 52.36 g (78% yield), by 65-67° C./0.3 mmHg.

Alternative Procedure: 4-Toluenesulfonic acid monohydrate (51.3 g) in acetone (275 mL) was stirred with 2,2-dimethoxy propane (75 mL) and toluenesulfonic acid monohydrate (1.3 g) for 18 hours at room temperature, and worked up in a similar manner as indicated in the procedure above, to afford 52.12 g (76% yield), by 72-75° C./0.65 mmHg. Mass spec: m/z 161 (M$^+$+1). Anal Calcd for $C_8H_{16}O_3$: C, 59.98; H, 10.07%. Found: C, 59.62; H, 10.07%. $^1$H NMR (CDCl$_3$) δ ppm: 0.83 (s, 3H), 1.40 (s, 3H), 1.44 (s, 3H), 3.59-3.69 (m, 6H). $^{13}$C NMR: 17.69, 20.25, 27.41, 34.86, 65.90, 66.43, 98.1 (7 sp$^3$C).

EXAMPLE 6

2,2,5-Trimethyl-5-[(3-bromophenoxy)]methyl-1,3-dioxane via Ulmann Ether Reaction A mixture of 3-bromoiodobenzene (0.85 g, 3.0 mmol), 2,2,5-trimethyl-5-hydroxymethyl-1,3-dioxane (1.25 g, 7.8 mmol), copper (I) iodide (0.065 g, 0.38 mmol), 1,10-phenanthroline (0.122 g, 0.68 mmol), and cesium carbonate (2.54 g, 7.8 mmol) was heated to 110° C. in an oil bath and held at this temperature for 20 hours. After cooling, the mixture was diluted with toluene, filtered, and the filtrate was transferred to a column of silica gel. Elution with toluene gave the product as a colorless liquid, 0.56 g (59% yield). The product solidifies on standing with hexanes, m.p. 66-67° C. Mass spec: m/z 314, 316 (M$^+$). Anal Calcd for $C_{14}H_{19}BrO_3$: C, 53.34; H, 6.08; Br, 25.35%. Found: C, 52.98; H, 5.91; Br, 25.44%. $^1$H NMR (CDCl$_3$) δ ppm: 0.94 (s, 3H), 1.41 (s, 3H), 1.47 (s, 3H), 3.73 (dd, J=12 Hz, 2H), 4.00 (s, 2H), 6.85-6.88 (m, 1H), 7.06-7.08 (m, 1H), 7.10-7.15 (m, 2H).

EXAMPLE 7

2,2,5-Trimethyl-5-[(3-bromophenoxy)]methyl-1,3-dioxane via Mitsunobu reaction To a mechanically stirred mixture of 3-bromophenol (26.14 g, 0.1511 mol), 2,2,5-trimethyl-5-hydroxymethyl-1,3-dioxane (31.98 g, 0.20 mol), triphenylphosphine (59.32 g, 0.226 mol), and THF (250 mL), cooled to −2° C., a solution of diisopropyl azodicarboxylate (DIAD), 4.6 mL, 0.2265 mol) in THF (50 mL) was added dropwise over 45 minutes, and the mixture was allowed to warm up to room temperature. After 3 days, THF was removed and the residue was stirred in a mixture of toluene and heptane (1:1, 300 mL), and filtered. The solids were washed with the same mixture of solvents (200 mL), and the combined filtrates were washed with dilute sodium hydroxide solution, water, and saturated sodium chloride solution, dried and concentrated. The residue was chromatographed over silica gel. Elution with toluene-heptane (1:1) removed some unreacted triphenylphosphine. The product came in toluene-heptane (3:1) eluates, and on standing with pentane solidified, 40.69 g (85% yield), m.p. 67-70° C. Mass spec: m/z 314, 316 (M$^+$). Anal Calcd for $C_{14}H_{19}BrO_3$: C, 53.34; H, 6.08; Br, 25.35%. Found: C, 53.37; H, 5.97; Br, 25.35%.

EXAMPLE 8

3-[5-(2,2,5-Trimethyl-1,3-dioxanyl)methoxy]-diphenylamine

A mixture of 2,2,5-trimethyl-5-(3-bromophenoxy)-methyl-1,3-dioxane (7.88 g, 25.0 mmol), aniline (4.6 mL, 50.0 mmol), and toluene (100 mL) was azeotroped dry under nitrogen and cooled. Bis(dibenzylideneacetone)palladium(0) (0.172 g, 0.3 mmol), 1,1'-bis(diphenylphosphino)ferrocene (0.21 g, 0.38 mmol), and sodium t-butoxide (3.64 g, 37.9 mmol) were added, and the mixture was held at 88° C. for 4 hours. After cooling, the mixture was treated with water, the organic phase dried, and transferred to a column of silica gel. Elution with toluene, gave the product, which on standing in hexanes solidified, 7.2 g (88% yield), m.p. 93-96° C. Recrystallization from heptane raised the mp to 104-105° C. in 97% recovery. Mass spec: m/z 327 (M$^+$). Anal Calcd for $C_{20}H_{25}O_3$: C, 73.37; H, 7.70; N, 4.28%. Found: C, 73.21; H, 7.62; N, 4.13%. $^1$H NMR (CDCl$_3$) δ ppm: 0.95 (s, 3H), 1.40 (s, 3H), 1.46 (s, 3H), 3.66 (d, J=12 Hz, 2H), 3.80 (d, J=12.1 Hz, 2H), 3.96 (s, 2H), 6.69 (broad s, 1H), 6.49-6.52 (m, 1H), 6.63-6.66 (m 2H), 6.92-6.96 (m, 1H), 7.07-7.7.10 (m, 2H), 7.15 (t, J=8.08 Hz, 1H), 7.25-7.29 (m, 2H). $^{13}$C NMR: 18.16, 20.38, 27.36, 34.30, 66.50, 70.50 (6 sp$^3$C), 98.14, 104.18, 107.04, 110.37, 118.36, 121.29, 129.49, 130.16, 143.04, 144.59, 160.54 (11 sp$^2$C).

EXAMPLE 9

2,4,6-Tris(7-bromo-9,9-diethylfluoren-2-yl)-1,3,5-triazine

To trifluoromethanesulfonic acid (11.0 mL), cooled in a bath of ice and salt, 7-bromo-9,9-diethylfluorene-2-carbonitrile (Example 4; 10.17 g) was added in portions, and then allowed to warm up to room temperature. After 24 hours, the thick reaction mixture was diluted with chloroform (10 mL), and stirred for an additional 24 hours. Then the mixture was poured into crushed ice, and the slurry was treated with ammonium hydroxide until the mixture was colorless. Chloroform was allowed to evaporate, and the mixture was filtered to get the crude triazine, 10.62 g. This was recrystallised from a mixture of toluene and heptanes with clarification, and the product was dried at 150° C., 9.68 g (95% Yield), m.p. 175-177° C. Mass spec: m/z 977, 979, 981 (M$^+$). Anal Calcd for $C_{54}H_{48}N_3Br_3$: C, 66.27; H, 4.94; N, 4.29; Br, 24.49%. Found: C, 66.65; H, 5.04; N, 4.27; Br, 24.63%. $^1$H NMR (CDCl$_3$) δ ppm: 0.43 (t, J=7.32 Hz, 18H), 2.13 (sextet, J=6.95 Hz, 6H), 2.26 (sextet, J=7.13 Hz, 6H), 7.53-7.56 (m, 6H), 7.70 (d, J=7.92 Hz, 3H), 7.91 (d, J=7.92 Hz, 3H), 8.74 (d, J=1.04 Hz, 3H), 8.86 (dd, J=1.46 and 7.98 Hz, 3H). $^{13}$C NMR: 8.75, 32.85, 56.84 (3 sp$^3$C), 120.05, 122.01, 122.45, 123.42, 126.63, 128.75, 130.45, 135.69, 139.86, 145.09, 150.12, 153.45, and 171.83 (13 sp$^2$C).

EXAMPLE 10

2,4,6-Tris{7-(3-[5-(2,2,5,-trimethyl-1,3-dioxanyl) methoxy]diphenylamino)-9,9-diethylfluoren-2-yl}-1, 3,5-triazine A mixture of 2,4,6-tris(7-bromo-9,9-diethylfluoren-2-yl)-1,3,5-triazine (10.3 g, 10.5 mmol), 3-[5-(2,2,5-trimethyl-1,3- dioxanyl)methoxy]-diphenylamine (10.83 g, 33.1 mmol), and toluene (225 mL) was azeotroped dry under nitrogen, and cooled. Bis(dibenzylideneacetone)palladium(0) (0.28 g, 0.49 mmol), 1,1'-bis(diphenylphosphino)ferrocene (0.278 g, 0.5 mmol), and sodium t-butoxide (4.52 g, 47.0 mmol) were then added, and the mixture was held at 75° C. for 20 hours. After cooling, the mixture was diluted with toluene and water, and the organic phase was washed with water, dried and concentrated. The column was first eluted with toluene to remove the diphenylamine starting material, and then with 2% ethyl acetate-toluene to get the product, 16.58 g (92% yield). The solvent free product had m.p. 143-146° C. MALDI (terthiophene as matrix) Mass spec: m/z 1717.7, 1718.7, 1719.7, 1720.7, 1721.8, 1722.8. Anal Calcd for $C_{114}H_{120}N_6O_9$: C, 79.69; H, 7.04; N, 4.89. Found: C, 79.81; H, 7.04; N, 4.80%. $^1$H NMR (CDCl$_3$) δ ppm: 0.46 (t, J=7.3 Hz, 18H), 0.92 (s, 9H), 1.38 (s, 9H), 1.44 (s, 9H), 2.02 (sextet, J=7.03, 6H), 2.19 (sextet, J=6.95 Hz, 6H), 3.63 (d, J=12 Hz, 6H), 3.77 (d, J=11.96 Hz, 6H), 3.92 (s, 6H), 6.63 (dd, J=1.84, and 8.16 Hz, 3H), 6.70-6.75 (m, 6H), 7.04-7.31 (m, 24H), 7.69 (d, J=8.20 Hz, 3H), 7.84 (d, J=8.0 Hz, 3H), 8.72 (s, 3H), 8.84 (dd, J=1.40, and 8.00 Hz), 3H). $^{13}$C NMR: 8.86, 18.13, 20.26, 27.42, 32.80, 34.25, 56.42, 66.44, 70.42 (9 sp$^3$C), 98.12, 108.94, 110.56, 116.74, 119.19, 119.23, 121.37, 123.06, 123.19, 123.58, 124.56, 128.67, 129.39, 129.93, 134.57, 135.79, 145.99, 147.90, 148.23, 149.16, 150.34, 152.66, 160.29, 171.80 (24 sp$^2$C).

EXAMPLE 11

2,4,6-Tris{7-[3-(2,2-di(hydroxymethyl)-propyloxy)]diphenylamino]-9,9-diethylfluoren-2-yl)}-1,3,5-triazine (AF-452-6OH)

Dowex resin (Dowex-50WX2-100, 50 g), was suspended in methanol, filtered and washed with methanol. To a solution of 2,4,6-tris{7-(3-[5-(2,2,5,-trimethyl-1,3-dioxanyl)methoxy]diphenylamino)-9,9-diethylfluoren-2-yl}-1,3,5-triazine (Example 10) (10 g) in a mixture of THF (200 mL), and methanol (200 mL), the washed Dowex resin was added, and the mixture was stirred at 40° C. for 22 hours. After cooling to room temperature, 28% ammonium hydroxide (20 mL) was added, and the mixture was filtered. The resin was washed with THF containing ammonium hydroxide, and the filtrate was concentrated. The residue was suspended in toluene (100 mL), and the suspension concentrated. The residue was transferred to a column of silica gel. The column was first eluted with ethyl acetate, and then with 10% THF-ethyl acetate. The residue remained on concentration of the latter fractions was dissolved in THF (100 mL) and water (50 mL), and treated with lithium hydroxide monohydrate (2.13 g). After 6 hours at 45° C., the ethylacetate free product solution was treated with ammonium chloride (2.7 g) to discharge the orange color and then concentrated. The product suspension in water was collected, redissolved in THF (100 ml) and water (40 mL), filtered. THF was removed using a stream of nitrogen and the lost volume was periodically made up with water. The suspension of the product was filtered, and dried, 8.34 g (90%), m.p. 186-189° C. MALDI Mass spec: m/z 1597.0, 1598.0, 1599.0, 1600.1 (M$^+$). Anal Calcd for $C_{105}H_{108}N_6O_9$: C, 78.92; H, 6.81; N, 5.26%. Found: C, 78.74; H, 6.90; N, 5.15%. $^1$H NMR (CDCl$_3$) δ ppm: 0.46 (t, 18H), 0.92 (s, 9H), 2.02 (m, 6H), 2.15 (m, 6H), 2.18 (m, 6H), 3.65 (m, 6H), 3.74 (m, 6H), 3.88 (s, 6H), 6.68 (d, 3H), 6.83 (m, 6H), 7.04 (m, 6H), 7.16 (m, 12H), 7.36 (m, 6H), 7.69 (d, 3H), 7.86 (d, 3H), 8.51 (s, 3H), 8.85 (d, 3H). $^{13}$C NMR: 8.71, 17.08, 32.64, 40.71, 56.27, 67.90, 71.40 (7 sp$^3$C), 108.75, 110.03, 116.80, 119.10, 121.26, 123.08, 123.52, 124.50, 128.56, 129.29, 129.90, 134.49, 135.78, 145.77, 147.67, 147.99, 149.16, 150.18, 152.55, 159.73, and 171.66 (21 sp$^2$C).

EXAMPLE 12

AF-452-6OH—Hexaacetate

To a cooled solution of 2,4,6-tris{7-[3-(2,2-di(hydroxymethyl)-propyloxy)]diphenylamino]-9,9-diethylfluoren-2-yl)}-1,3,5-triazine (AF-452-6OH; 0.418 g) in pyridine (3 mL), acetic anhydride (2 mL) was added, and the mixture was poured into water. The separated solids were transferred to a column of silica gel, and the column was eluted with 20% ethyl acetate/toluene to get the hexa acetate (0.358 g). A mass spectrum was not obtained due to decomposition of the compound under electron impact conditions. Anal Calcd for $C_{117}H_{120}N_6O_{15}$: C, 75.95; H, 6.54; N, 4.54%. Found: C, 75.72; H, 6.64; N, 4.29%. $^1$H NMR (CDCl$_3$) δ ppm: 0.46 (t, 18H), 1.06 (s, 9H), 2.02 (s, 18H), 2.00-2.03 (m, 6H), 2.04-2.20 (m, 6H), 3.76 (s, 6H), 4.08 (s, 12H), 6.56-6.58 (dd, 3H), 6.68-6.74 (m, 6H), 7.01-7.09 (m, 6H), 7.15-7.19 (m, 12H), 7.26-7.32 (m, 6H), 7.70 (d, 3H), 7.84 (d, 3H), 8.72 (s, 3H), and 8.84 (dd, 3H).

EXAMPLE 12

To a solution of Desmodur W (cyclo-aliphatic diisocyanate; 51.0 mg) and AF-452-6OH (Example 11; 80 mg) in ethyl acetate (220 mg) was added 10 μL of 0.005 wt % dibutyltin dilaurate solution in hexane. The mixture was cured for 48 hr at room temperature in a partially sealed vial to a cloudy rubber state.

EXAMPLE 13

Desmodur 4470 SN (isophorone diisocyanate; 73 mg) and AF-452-6OH (53 mg) were dissolved in ethyl acetate (150 mg), and the mixture was cured for 48 hr at room temperature in a sealed vial to a cloudy rubber state.

EXAMPLE 14

Desmodur IL BA (toluene diisocyanate; 141.5 mg) and AF-452-6OH (Example 11; 68.3 mg) were dissolved in ethyl acetate (200 mg). The mixture was cured for 24 hr at room temperature in a sealed vial and 18 hr at 70° C./0.3 torr to give a hard, yellow, optically clear glass.

EXAMPLE 15

Desmodur 3300A (45 mg; Desmodur N 3300A is a solvent free polyfunctional aliphatic isocyanate resin based on hexamethylene diisocyanate) and AF-452-6OH (Example 11; 58.5 mg) were dissolved in ethyl acetate (150 mg). The mixture was cured for 24 hr at room temperature in a sealed vial, 24 hr in an open vial, and 24 hr at 75° C. to give a hard, optically clear glass.

EXAMPLE 16

Desmodur RFE (146.6 mg; Desmodur RFE polyisocyanate is a solution of tris(p-isocyanatophenyl)thiophosphate, 27% in ethyl acetate) and AF-452-6OH (Example 11; 64 mg) were dissolved in ethyl acetate (25 mg). The mixture was cured for 24 hr at room temperature in a sealed vial and 18 hr at 70° C. and 0.3 torr to give a hard, optically clear glass which was a deep reddish-purple most likely due to the acidity of the Desmodur RFE product.

EXAMPLE 17

Desmodur N3200 (+ AF-452-6OH

1) Desmodur 3200N(N,N',N"-tris(6-isocyanatohexamethylene) biuret;115.7 mg) and AF-452-6OH (Example 11; 156.5 mg) were dissolved in ethyl acetate (414 mg) The mixture was cured for 48 hr at room temperature in a sealed vial to a give a viscous liquid. The cap was removed and the vial placed in a sealed oven for 48 hr to give a soft rubber. The temperature was increased to 80° C. for 24 hr to give a hard, optically-clear glass with a large meniscus. Isothermal aging at 150° C. by TGA showed that most weight loss had occurred during the first 5 hour period and after for 90 hr, 13 wt % (solvent) remained.

2) Desmodur 3200N (228 mg) and AF-452-6OH (297.6 mg) were dissolved in ethyl acetate (800 mg) and filtered through a 0.2 μm PTFE syringe filter into a mold made from an inverted PTFE liner for a 14/20 ground glass joint which had been epoxied onto a microscope slide. The mixture was cured for 21 hr at room temperature in a sealed oven to a give a gel. The temperature was increased to 80° C. and striations were evident within 0.5 hr.

3) Desmodur 3200N (228 mg) and AF-452-6OH (297.6 mg) were dissolved in ethyl acetate (800 mg) and filtered through a 0.2 μm PTFE syringe filter into a mold made from an inverted, PTFE liner for a 14/20 ground glass joint which had been epoxied onto a microscope slide. The mixture was cured for 5 days at room temperature in a sealed oven, and then the temperature was increased to 75° C. for 24 hr to give a hard glass. The sample was removed from the mold by soaking in distilled water overnight and was polished to 1 mm thickness.

4) Desmodur 3200N (30.2 mg) and AF-452-6OH (40.9 mg) were dissolved in ethyl acetate (4.89 g, 1.2 wt % solids) and filtered through a 0.2 μm PTFE syringe filter onto glass or sapphire substrates for spin coating at 2000 rpm for 30s followed by 3000 rpm for 30 s. Generally, the results were better for glass substrates.

5) Desmodur 3200N (35.7 mg) and AF-452-6OH (48 mg) were dissolved in ethyl acetate (2.56 g, 3.2 wt % solids) and filtered through a 0.2 μm PTFE syringe filter onto a silicon substrate for spin coating at 1000 rpm for 30 s. A second sample was prepared at 2000 rpm for 30 s. Both samples were then placed in a sealed oven at 80° C. overnight.

EXAMPLE 18

Curing of Desmodur N3200 (N,N',N"-tris(6-isocyanatohexamethylene)biuret+AF-452-6OH+a diol To a solution of Desmodur N3200 (1.67 g) and AF-452-6OH (Example 11; 0.015 g) in ethyl acetate (2 mL) was added 1,6-hexanediol (0.47 g), and the mixture was blended at 3500 rpm for 2 min. To keep the diol in solution, the reaction mixture was placed in a thermostated oil bath at 73° C. for 16 hr to give a rubbery solid. Further curing at 100° C. and 0.6 torr for 2 hr gave a cracked solid.

1) A warm solution of Desmodur N3200 (1.720 g) and 1,6-hexanediol (0.47 g) in ethyl acetate (1.0 mL) was thoroughly mixed and divided into two 1 dram vials. AF-452-6OH (11.0 mg) was dissolved in one vial and a catalytic amount of dibutyltin dilaurate was added to both vials. Both materials were cured for 24 hr at room temperature to a hard, optically-clear rubber state and were then placed in a 75° C. oven for 48 hr to further harden.

2) AF-452-6OH (152.7 mg) and 1,4-butanediol (25.9 mg) were dissolved in ethyl acetate (206 mg) and added to Desmodur 3200N (220 mg). This mixture was diluted with ethyl acetate (200 mg) and filtered through a 0.2 μm PTFE syringe filter into a mold made from an inverted, PTFE liner for a 14/20 ground glass joint which had been epoxied onto a microscope slide. The mixture was cured for 12 days at room temperature in a sealed oven, and then the temperature was increased to 75° C. for 48 hr to give a hard glass which was slightly cloudy.

3) Desmodur 3200N (222 mg) and 2,2,3,3,4,4,5,5-octafluorohexane-1,6-diol (152 mg) were dissolved in ethyl acetate (500 mg) and poured onto a 1" square glass slide previously cleaned with methanol. The sample was left covered with a beaker in a hood for 24 hr and was then placed in a vacuum oven for 24 hr at 70° C., 5 hr at 70° C./0.5 torr to give an optically clear film.

4) Desmodur 3200N (127 mg) and 2,2,3,3,4,4,5,5,6,6,7,7,8,8,9,9,10,10,11,11-icosafluorododecane-1,12-diol (187 mg) were dissolved in ethyl acetate (553 mg) and poured onto a 1" square glass slide previously cleaned with methanol. The sample was left covered with a beaker in a hood for 24 hr and was then placed in a vacuum oven for 24 hr at 70° C., 5 hr at 70° C./0.5 torr to give a phase-separated film.

EXAMPLE 19

Desmodur N3200 (N,N',N"-tris(6-isocyanatohexamethylene)biuret+AF-452-6OH+2,2-di(4-hydroxyphenyl)-1,1,1,3,3,3-hexafluoro-propane (6F-BPA)

1) AF-452-6OH (153.4 mg) and 6F-BPA (25.9 mg) were dissolved in ethyl acetate (204 mg) and added to Desmodur 3200N (220 mg). This mixture was diluted with ethyl acetate (200 mg) and filtered through a 0.2 μm PTFE syringe filter into a mold made from an inverted, PTFE liner for a 14/20 ground glass joint which had been epoxied onto a microscope slide. The mixture was cured for 12 days at room temperature in a sealed oven, and then the temperature was increased to 75° C. for 48 hr to give a hard, optically clear glass.

2) Desmodur 3200N (2.46 g) and 6F-BPA (2.16 g) were dissolved in ethyl acetate (4.6 g), and the solution was divided equally among five 1 dram vials. Portions of a stock solution of AF-452-6OH in ethyl acetate ($1.08 \times 10^{-3}$ M) were added to the vials in the following amounts: 0, 1, 10, 100, 1000 μL. The vials were placed unsealed in an oven at 70° C. for 1 hr and then poured onto 1" square glass slides previously cleaned with methanol. The samples were left covered with a beaker in a hood for 24 hr and were then placed in a vacuum oven for 4 hr at 70° C., 1 hr at 100° C./300 torr, and 3 hr at 150° C./300 torr.

3) Desmodur 3200N (223 mg), 6F-BPA (161.8 mg), and AF-452-6OH (51.8 mg) were dissolved in ethyl acetate (925 mg) in a vial. The vial was placed sealed in an oven at 80° C. for 1 hr, and the solution was filtered through a 0.2 μm PTFE syringe filter onto a 1" square glass slide previously cleaned with methanol. The sample was left covered with a beaker in a hood for 48 hr and was then placed in a vacuum oven for 24 hr at 80° C., 24 hr at 80° C./0.5 torr, and 24 hr at 150° C./0.5 torr.

4) Desmodur 3200N (243 mg), 6F-BPA (213 mg), and AF-452-6OH (6.1 mg) were dissolved in ethyl acetate (840 mg) in a vial. The vial was placed sealed in an oven at 80° C. for 1 hr, and the solution was filtered through a 0.2 μm PTFE syringe filter onto a 1" square glass slide previously cleaned with methanol. The sample was left covered with a beaker in a hood for 48 hr and was then placed in a vacuum oven for 24 hr at 80° C., 24 hr at 80° C./0.5 torr, and 24 hr at 150° C./0.5 torr.

5) Desmodur 3200N (863 mg), 6F-BPA (759 mg), and AF-452-6OH (2.0 mg) were dissolved in ethyl acetate (760 mg). The solution was filtered through a 0.2 μm PTFE syringe filter into a ½ dram vial and was left sealed for 64.5 hr. The lid was partially opened, and the sample left for another 6 days. Finally, the lid was removed, and the sample was placed in an oven at 80° C. for 24 hr.

EXAMPLE 20

Desmodur N3200 (N,N',N''-tris(6-isocyanatohexamethylene)biuret+AF-452-6OH+catalyst (dibutyltin dilaurate)

1) A warm solution of Desmodur 3200N (1.720 g) and 1,6-hexanediol (0.47 g) in ethyl acetate (1.0 mL) was thoroughly mixed and divided into two 1 dram vials. AF-452-6OH (11.0 mg) was dissolved in one vial and a catalytic amount of dibutyltin dilaurate was added to both vials. Both materials were cured for 24 hr at room temperature to a hard, optically-clear rubber state and were then placed in a 75° C. oven for 48 hr to further harden.

2) To a solution of Desmodur 3200N (63.5 mg) and AF-452-6OH (85.6 mg) in ethyl acetate (200 mg) was added 104 of 0.005 wt % dibutyltin dilaurate solution in hexane. The mixture was cured for 48 hr at room temperature in a partially sealed vial to a hard, optically-clear rubber state and was then placed in an 80° C. oven overnight to further harden. The resulting material was clear but contained optical stria.

3) To a solution of Desmodur W (51.0 mg) and AF-452-6OH (80 mg) in ethyl acetate (220 mg) was added 104 of 0.005 wt % dibutyltin dilaurate solution in hexane. The mixture was cured for 48 hr at room temperature in a partially sealed vial to a cloudy rubber state.

Having thus described exemplary embodiments of the present invention, it should be noted by those skilled in the art that the disclosures herein are exemplary only and that alternatives, adaptations and modifications may be made within the scope of the present invention.

We claim:

1. Two-photon active cross-linked polyurethane compositions derived from the polymerization of (i) a difunctional isocyanato monomer, (ii) a trifunctional isocyanato monomer, or (iii) mixtures thereof; and a polyhydroxy tris(diarylamino-9,9-dialkylfluorenyl)-1,3,5-triazine with the following structure:

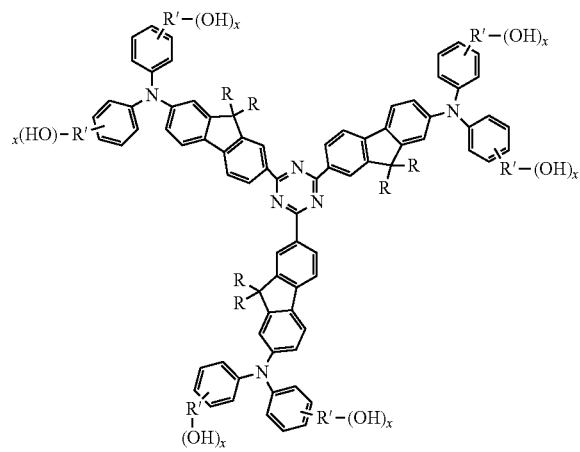

wherein R is a linear or branched alkyl group, $—C_mH_{2m+1}$, where m is from 1 to 6, or an alkylether group, $—(CH_2CH_2O)_p$Me, where p is from 1 to 5, wherein the R'—(OH)$_x$ groups are attached to the phenyl rings of the triarylamine moiety either in a para or a meta position, R' is a linear or branched alkyl group, and wherein X is from 1 to 3.

2. The cross-linked polyurethane compositions of claim 1 wherein N,N',N''-tris(6-isocyanatomethylene)biuret is used as the trifunctional isocyanato monomers to react with a polyhydroxy tris(diarylamino-9,9-dialkylfluorenyl)-1,3,5-triazine in the equivalent molar ratio range of NCO (isocyanate):OH (hydroxyl) from 0.9:1.0 to 0.9:1.10.

3. The cross-linked polyurethane compositions of claim 1 wherein 2,4,6-tris(6-isocyanatomethylene)isocyanurate is used as the trifunctional isocyanato monomers to react with a polyhydroxy tris(diarylamino-9,9-dialkylfluorenyl)-1,3,5-triazine in the equivalent molar ratio range of NCO (isocyanate):OH (hydroxyl) from 0.9:1.0 to 0.9:1.10.

4. The cross-linked polyurethane compositions of claim 1 wherein tris(p-isocyanatophenyl)thiophosphate is used as the trifunctional isocyanato monomers to react with a polyhydroxy tris(diarylamino-9,9-dialkylfluorenyl)-1,3,5-triazine in the equivalent molar ratio range of NCO (isocyanate):OH (hydroxyl) from 0.9:1.0 to 0.9:1.10.

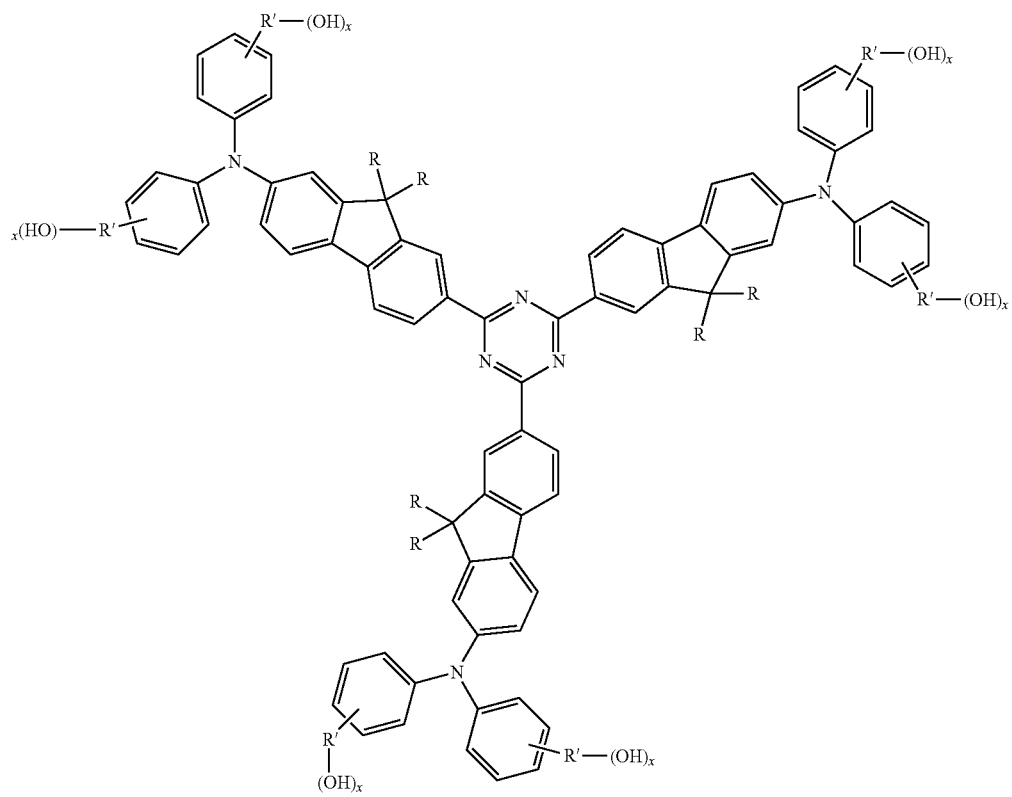
wherein R is a linear or branched alkyl group, —$C_mH_{2m+1}$, where m is from 1-6 or an alkylether group, —$(CH_2CH_2O)_p$Me, where p is from 1 to 5, wherein the R'—(OH)$_x$ groups are attached to the phenyl rings of the triarylamine moiety either in a para or a meta position, where X=1-3.
5. The two-photon active cross-linked polyurethane compositions of claim 1 having the following structure:
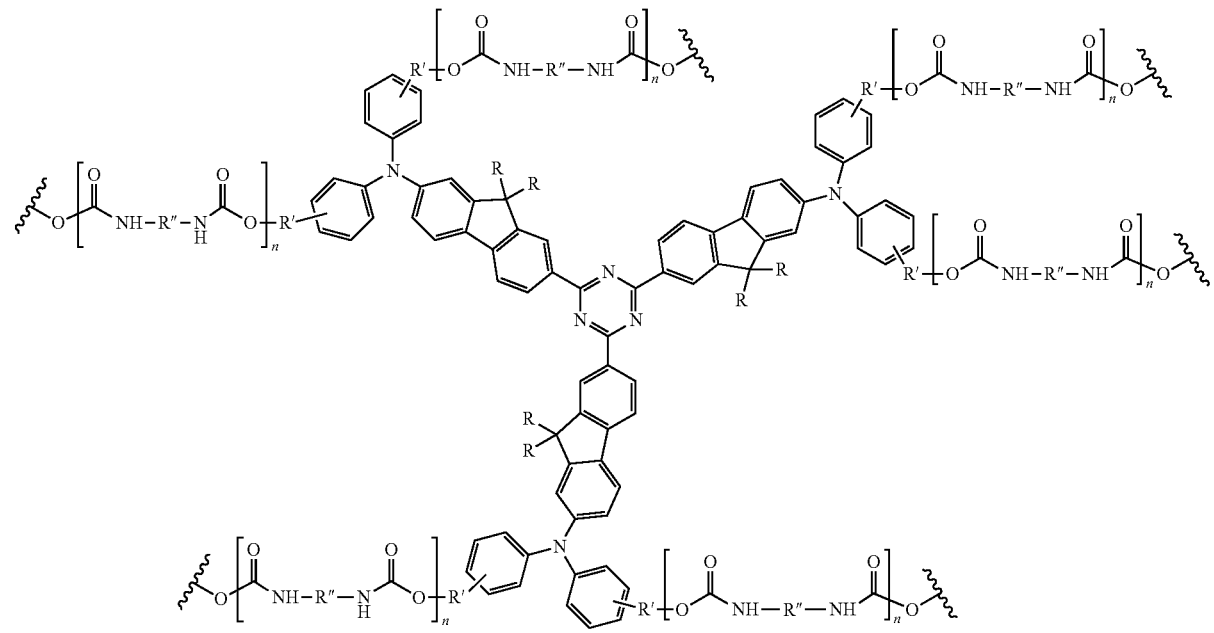

wherein R=linear or branched alkyl groups, $-C_mH_{2m+1}$, wherein m is from 1-6 or an alkylether group, $-(CH_2CH_2O)_pMe$, where p is from 1 to 5; R' is a linear or branched alkyl group, R" is a linear or branched alkyl groups, or cycloaliphatic groups, wherein the aromatic substitution pattern for each of the R' groups can be in either meta or para position with reference to the triarylamine nitrogen atom, wherein n is 1.

* * * * *